J. D. MAXWELL.
VALVE CONSTRUCTION.
APPLICATION FILED JUNE 8, 1921.

1,420,663.

Patented June 27, 1922.

INVENTOR
JAMES D. MAXWELL.
BY
Philip S. McLean.
ATTORNEY

UNITED STATES PATENT OFFICE.

JAMES D. MAXWELL, OF BROOKLYN, NEW YORK.

VALVE CONSTRUCTION.

1,420,663.  Specification of Letters Patent.  Patented June 27, 1922.

Application filed June 8, 1921. Serial No. 476,030.

*To all whom it may concern:*

Be it known that I, JAMES D. MAXWELL, a subject of the King of Great Britain, and a resident of Brooklyn, Kings County, and State of New York, have invented certain new and useful Improvements in Valve Constructions, of which the following is a specification.

My present invention relates particularly to valves of the heavy duty high pressure type, such as disclosed in my co-pending application Serial #461,493.

In the form of construction referred to, two valve elements are provided working in opposite directions against oppositely facing valve seats and an operating stem is provided having a screw connection with one valve and a connection for shifting the other valve longitudinally. A special feature of the screw connected valve is that it is held to its seat by a spring during the first part of the valve-opening movement, that is, while the other valve is being lifted away from its seat.

The principal object of this invention is to provide simple and practical means for holding the spring-pressed valve to its seat in the case of breakage or injury to the spring, or in fact, in case of any other disabling injury, such as breakage of the valve stem or its connection with the valve.

Another important object is to provide a device for holding one of the valves seated which will in no way interfere with the normal, free operation of the valve and which can be made tight and proof against leakage both when in use and when not in actual use.

Other objects, in addition to the many novel features of the invention will appear as the specification proceeds.

In the accompanying drawing forming part of this specification, I have illustrated the invention embodied in but one of its practical, commercial forms and for that reason wish it understood that the structure may be modified in various respects without departure from the broad spirit and scope of the invention as hereinafter defined and claimed.

Figure 1:
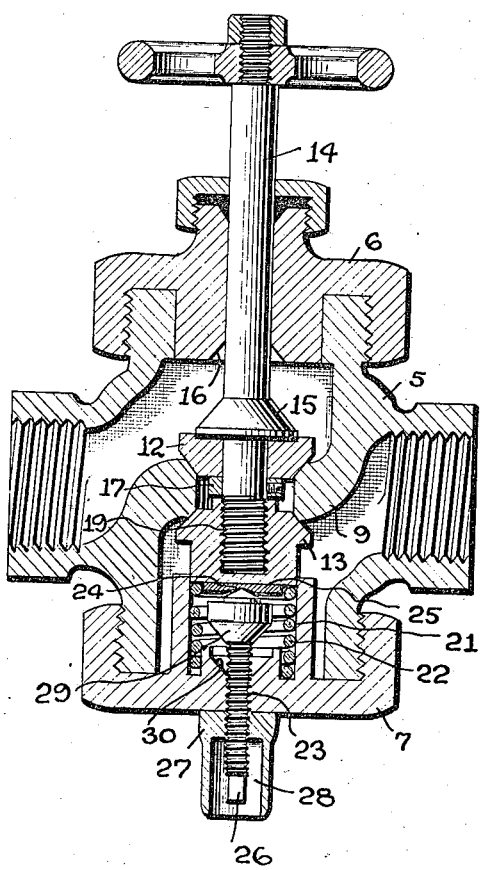

Figure 1 in the drawing referred to is a vertical or longitudinal sectional view of the valve, showing the valve parts in the closed relation and the valve holding device as in use to hold the spring-pressed valve against its seat.

Figure 2:
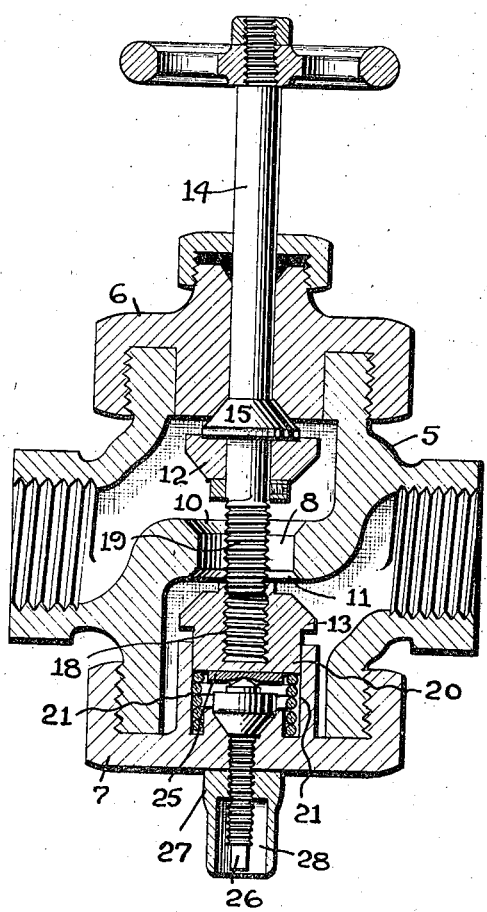

Figure 2 is a similar view with the valve parts in open position and the valve holding device in its retracted inactive position.

The valve casing, which may be of any desirable shape or form to suit various uses and requirements, is designated 5, and is shown as provided with top and bottom bonnets or covers 6 and 7 having screw-threaded connection therewith.

The valve passage consists in this instance of an opening 8 through the partition or separation wall 9 and this passage is provided with the oppositely facing valve seats 10 and 11 at the upper and lower ends thereof adapted to be engaged respectively by the valve elements 12 and 13.

14 designates the valve operating stem having a rotating and sliding bearing on the top cover and provided with an enlargement or shoulder having a conical face 15 to engage a correspondingly shaped seat 16 in the cover.

The upper valve member 12 is, in this case, rotatably confined on the operating stem so as to travel longitudinally therewith, it being shown for this purpose as held between the fixed shoulder 15 and a screw secured abutment collar 17.

The other or lower valve member is shown as having a screw connection with the operating stem, being provided with a screw seat 18 receiving the lower screwthreaded end 19 of the stem. To make this screw connection effective, the valve 13 is held against rotation in respect to the valve stem by constructing it with a square or angular boss 20 operating in a correspondingly angular seat 21 carried by the lower cover.

The spring which thrusts the lower valve toward its seat is designated 22 and is shown as mounted in the angular seat 21 and as bearing directly against the lower end of the valve.

With the valve construction as thus far described, it will be apparent that when the valve is closed, with the lower vlave held by spring pressure to its seat, an unscrewing movement of the valve stem will result in the upper valve being lifted from its seat until the valve face 15 engages its seat 16, whereupon further unscrewing movement of the stem will cause the lower valve to be forced downwardly away from its seat as shown in Figure 2. The reverse motion of the valve stem first allows the spring to react so as to thrust the lower valve closed and then this valve operates as a nut enabling the screw stem to draw the upper valve firmly down into engagement with its seat.

The valve holding device consists in the present disclosure of a stem 23 having a screwthreaded bearing in the lower cover and having a connection at its inner end with the valve 13. This connection is provided in this particular illustration by means of a bearing point 24 on the inner end of the stem engaging a hardened thrust plate 25 on the bottom of the valve. The stem 23 is provided with suitable external operating means such as a squared head 26 for engagement by a key wrench and the stem is preferably secured in any of its adjusted relations by means of a lock nut 27 which may be hollowed as I have indicated at 28, to surround and form a housing for the projecting portion of the same.

To prevent leakage about the valve-holding stem, I preferably construct said stem with an annular shoulder or enlargement such as shown at 29 to cooperate with a seat 30 in the lower cover. As shown in Figure 2, when the stem is fully retracted, this shoulder engages the seat provided therefor and a tight joint is thereby formed overcoming any tendency of leakage at this point.

The advantages of this valve-holding device will be readily apparent. In case of breakage of the spring or the operating stem, for instance, the lower valve may be closed by turning the screw stem so as to force said valve toward its seat. After the valve is firmly seated, the lock nut 27 may then be adjusted both to secure the stem in this relation and also to make the stem absolutely tight so that there will be no leakage about the same. When the lower valve has been thus secured in its closed relation, it will be evident that the upper valve and its operating stem may be entirely removed, if that is desirable for the purpose of removing or repairing the operating stem, for instance, by simply taking off the top cover 6 and lifting out the parts through the top of the valve casing. In case of the breakage of the spring after the lower valve is forced closed and the operating stem is turned down to close the upper valve as in Figure 1, the lower cap may be removed, if there is no pressure at this side of the valve, and the broken spring be replaced by a new one. The invention thus makes it possible to readily make any necessary repairs.

The combination of the shoulder at the inner end of the screw stem and the lock nut at the outer end of said stem make it possible to prevent leakage about the stem at all times and irrespective of whether the stem is active or inactive as regards the functions of the valve. The screw stem serves a further useful purpose in that in its retracted position, as shown in Figure 2, it provides an adjustable stop for determining the opening movement of the lower valve.

What I claim is:

1. In a valve construction, a valve wall having a passage and valve seats at opposite ends of the same, oppositely working valves for engagement with said seats, an operating stem connected to effect the separation and approach of said valves, a spring tending to thrust one of the valves to its seat and means independent of said operating stem and spring for independently holding one of the valves engaged with its seat.

2. In a valve construction, a valve wall having a passage and valve seats at opposite ends of the same, oppositely working valves for engagement with said seats, an operating stem connected to effect the separation and approach of said valves and means independent of said operating stem and its connections for independently holding one of the valves engaged with its seat and including a screw engaging said valve, said screw and the casing of the valve having cooperating sealing faces engageable when the screw is not in use for holding the valve to its seat.

3. In a valve construction, a valve casing having a wall provided with a passage therethrough and with valve seats at opposite ends of the same, oppositely working valves for engagement with said seats, a valve stem connected to operate said valves, one in advance of the other, a spring exerting force to close the second-operated valve and means for holding said second-operated valve seated independently of the operating stem and spring.

4. In a valve construction, a valve casing having a wall with a passage and oppositely faced valve seats, oppositely operating valves for engagement with said seats, an operating stem having a screw connection with one of said valves, the other valve being mounted to move longitudinally with the stem, a spring for thrusting the screw connected valve to its seat and a screw for holding said valve seated.

5. In a valve construction, a valve casing having a wall with a passage and oppositely faced valve seats, oppositely operating valves for engagement with said seats, an operating stem having a screw connection with one of said valves, the other valve being mounted to move longitudinally with the stem, a spring for thrusting the screw connected valve to its seat and a screw for holding said valve seated, said screw having a shoulder and the valve casing having a corresponding seat to receive said shoulder.

6. In a valve construction, a valve casing having top and bottom covers each provided with a seat and a partition having a passage therethrough with oppositely facing valve seats, oppositely operating valves for engagement with said seats, a stem operating through one of the covers and having a shoulder to engage the seat on said cover, one of the valves being mounted to move longitudinally with said stem and the other valve having a screwthreaded connection with the stem, a spring operating on said screw connected valve and a screw mounted in the other cover in position to engage said valve and having a shoulder to engage the seat on said cover.

7. In a valve construction, a valve casing having top and bottom covers each provided with a seat and a partition having a passage therethrough with oppositely facing valve seats, oppositely operating valves for engagement with said seats, a stem operating through one of the covers and having a shoulder to engage the seat on said cover, one of the valves being mounted to move longitudinally with said stem and the other valve having a screwthreaded connection with the stem, a spring operated on said screw connected valve and a screw mounted in the other cover in position to engage said valve and having a shoulder to engage the seat on said cover, said cover also having a guide for directing the screw connected valve non-rotatably toward and away from its seat and the valve engaging screw having a lock nut disposed externally of the valve casing.

8. In a valve construction, a valve casing having a wall with a passage and oppositely faced valve seats, oppositely operating valves for engagement with said seats, an operating stem having a screw connection with one of said valves, the other valve being mounted to move longitudinally with the stem, a spring for thrusting the screw connected valve to its seat and a screw for holding said valve seated, said screw being positioned to operate as an adjustable stop for limiting the opening movement of the spring-pressed valve.

9. In a valve construction, a valve casing provided with a valve seat, a valve for engagement therewith, a spring for thrusting said valve to its seat, an operating stem connected to shift the valve from its seat, a stem having a screwthreaded mounting in the valve casing and positioned to operate on the valve to hold the same engaged with its seat.

10. In a valve construction, a valve casing provided with a valve seat, a valve for engagement therewith, a spring for thrusting said valve to its seat, an operating stem connected to shift the valve from its seat, a stem having a screwthreaded mounting in the valve casing and positioned to operate on the valve to hold the same engaged with its seat, said screw stem having a shoulder and the valve casing having a seat therefor.

11. In a valve construction, a valve casing provided with a valve seat, a valve for engagement therewith, a spring for thrusting said valve to its seat, an operating stem connected to shift the valve from its seat, a stem having a screwthreaded mounting in the valve casing and positioned to operate on the valve to hold the same engaged with its seat, said screw stem having a shoulder and the said screw stem having a seat therefor and a valve casing having a seat therefor and a lock nut engaging the screwthreaded portion of the stem for securing the same in either retracted or projected positions.

12. In a valve construction, a valve casing provided with a valve seat, a valve for engagement with said seat, an operating stem having a screwthreaded connection with said having a screwthreaded connection with said valve, a spring for thrusting the valve toward its seat, a stem having a screwthreaded bearing in the casing and positioned to operate on the valve so as to hold it seated, said stem having an operating portion disposed exteriorly of the valve casing and a lock nut on the exposed portion of said stem and having a tubular extension forming a housing for such exposed portion of the stem.

13. In a valve construction, a valve casing having a wall with a passage and oppositely faced valve seats, oppositely operating valves for engagement with said seats, an operating stem having a screw connection with one of said valves, the other valve being mounted to move longitudinally with the stem, a spring for thrusting the screw connected valve to its seat and a screw for holding said valve seated, the valve casing having a removable cap through which the operating stem with the valve carried thereby may be removed after the other valve has been closed.

14. In a valve construction, a valve casing having a wall with a passage and oppositely faced valve seats, oppositely operating valves for engagement with said seats, an operating stem having a screw connection with one of said valves, the other valve being mounted to move longitudinally with the stem, a spring for thrusting the screw connected valve to its seat and a screw for holding said valve seated, the valve casing having a removable cap through which the operating stem with the valve carried thereby may be removed after the other valve has been closed, said stem and cover having cooperating elements for preventing leakage about the stem and forming a thrust bearing for the stem.

15. In combination, a valve casing having a valve passage and oppositely facing valve seats at the opposite ends of said passage, valve elements for cooperation with said valve seats, means for shifting said valve elements toward and away from each other into and out of cooperative engagement with said seats, including an operating stem and a stem engaged with one of the valve elements and adapted to be moved so as to hold the same closed against its seat, independently of the operating stem.

In witness whereof, I have hereunto set my hand this 6th day of June, 1921.

JAMES D. MAXWELL.